April 17, 1945. W. M. EMERY 2,373,664
IMPACT CLUTCH
Filed Dec. 17, 1941 2 Sheets-Sheet 2
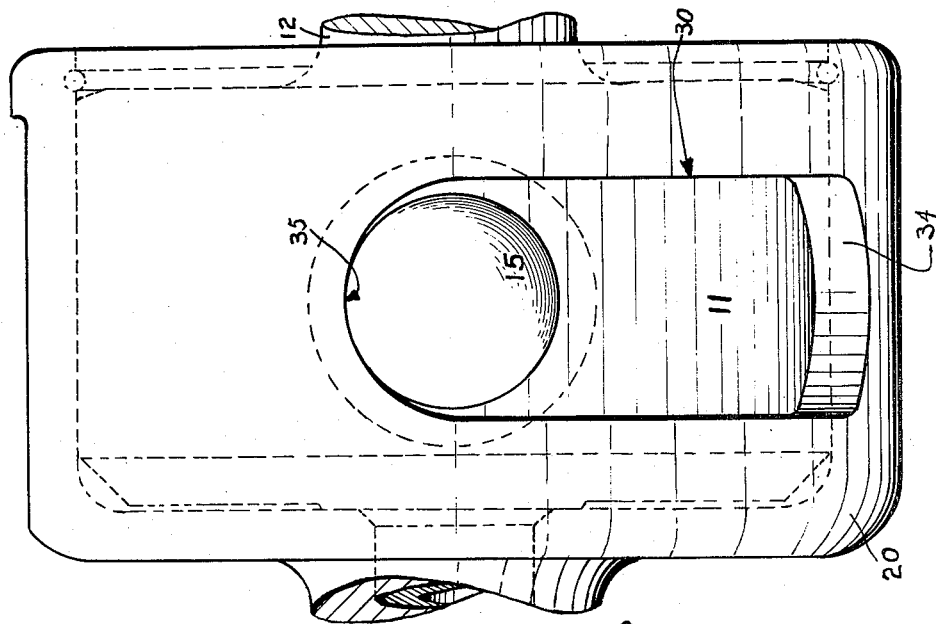
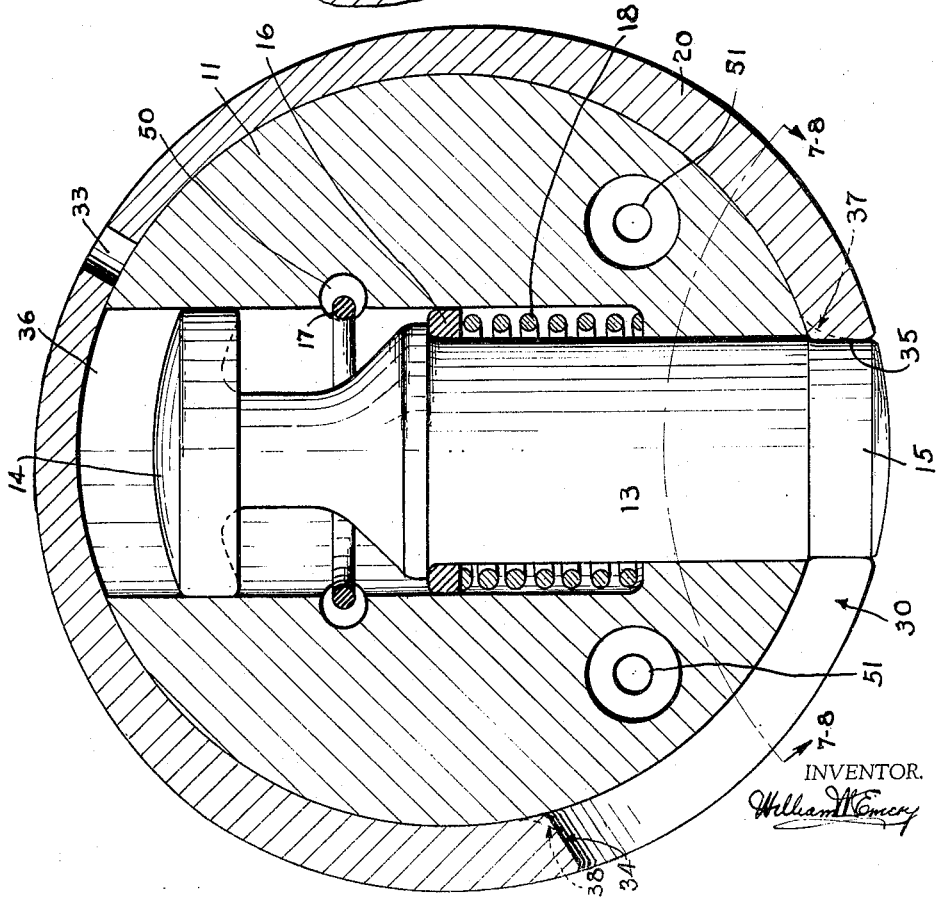
INVENTOR.
William M Emery Patented Apr. 17, 1945

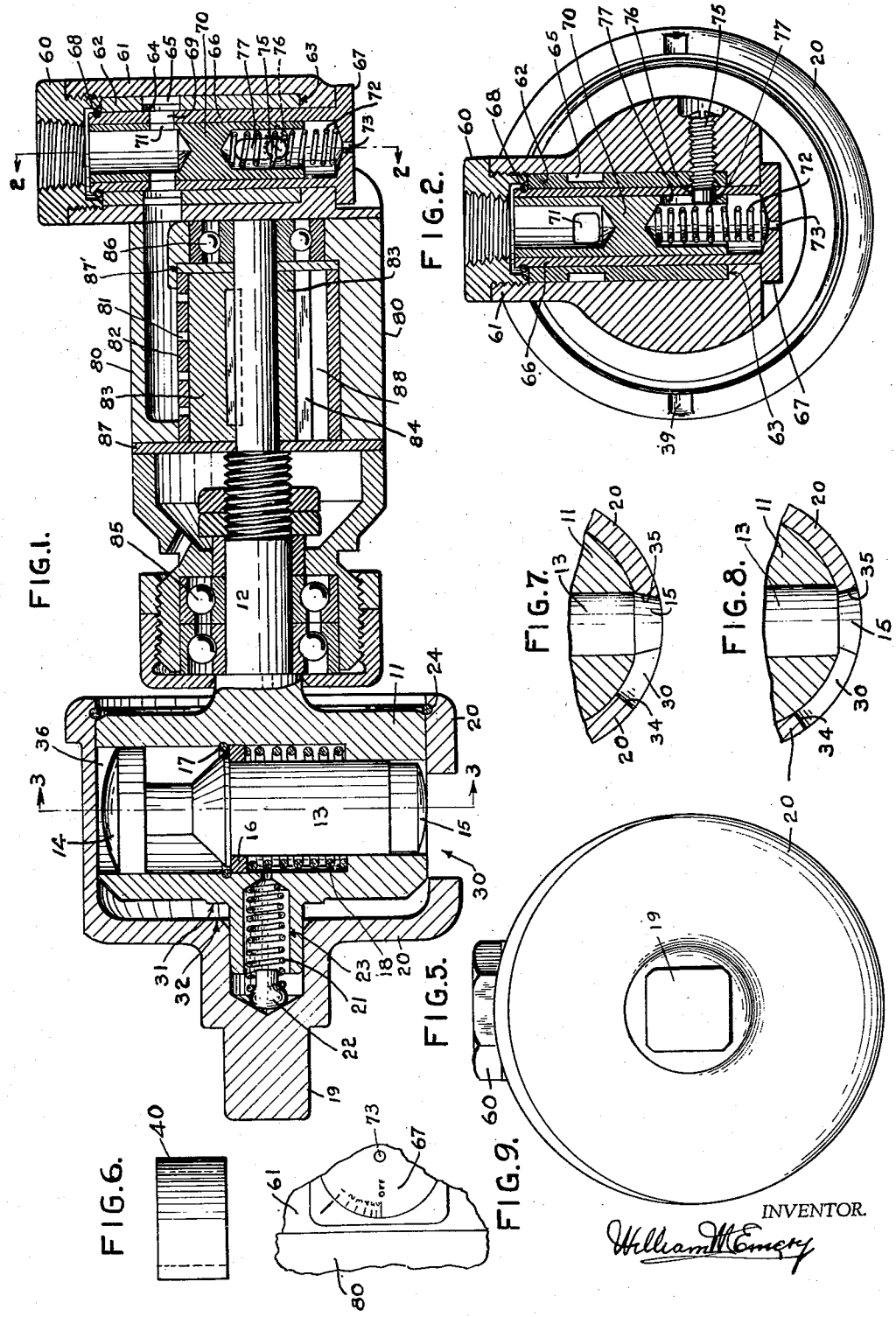

2,373,664

UNITED STATES PATENT OFFICE 2,373,664

IMPACT CLUTCH

William M. Emery, Shaker Heights, Ohio, assignor to The Rotor Tool Company, a corporation of Ohio Application December 17, 1941, Serial No. 423,320

20 Claims. (Cl. 192—30.5)

This invention relates to tools and suitable clutches and controls for running and setting nuts, screws, studs and the like, or any application where it is desirable to multiply the normal torque of the tool by the use of impact or forces incident to the sudden deceleration of revolving parts. Customarily, though not necessarily, it may be applied to portable rotary tools powered electrically, pneumatically or by fluid motors similar in general form to drills although frequently all gearing is omitted. Also to non-portable spindle machine tools and flexible shaft tools.

My invention utilizes many of the same forces and mechanical and physical principles set forth in my co-pending application #420,632, for a tool in the same field.

If one compares the simplicity of my construction with the more intricate constructions common in the art and on the market, it will be apparent that this invention materially advances the art, because I use only three major and rugged parts to carry the severe forces of impact and do not use any small strain-bearing parts or pivots or torque carrying springs. This is especially important because the failures of other tools have often been due to high maintenance cost and mechanical fatigue incident to the transference of the extreme loads of impact through involved mechanisms. Also since such loads are decreased as the radius moment, I employ as impact surfaces portions of my tool near its periphery. Accordingly, I have as objects of my invention, the provision of a tool of lighter weight, much simpler construction with fewer and more rugged impact parts, very accessible for assembly, disassembly, and repair, with impact surfaces near the periphery of the clutch, easily regrindable, more durable and more efficient in operation. Also to provide a tool wherein the foci of the impact forces are better distributed and mass is better distributed to receive these impact forces.

Another object is to provide a tool which will have the novel feature of effecting one impact blow for a plurality of revolutions of the hammer and to effect such blows only after the hammer has attained a predetermined speed to secure uniform and/or greater blows of predetermined force and to cause each impact or period of deceleration to cease only after the parts have been decelerated to a substantially uniform or predetermined speed. Another object is to provide a tool which, except as shown in the co-pending application mentioned, utilizes heretofore unused types of forces, and to accentuate their effectiveness by the novel design of related parts, thereby greatly increasing the efficiency. Another object is to provide a valve to regulate the flow of air at a certain pressure into the tool to govern the speeds of the tool and to automatically compensate for a change of air pressure by automatically changing the size of the port and to regulate said speed to harmonize with the predetermined speed and cyclic instant at which impact takes place. Another object is to produce a simple single clutch which both engages the drive through a longitudinal movement of the tool by the operator and also effects impact blows.

Another object is to provide a reversible tool, capable of higher speed operation with a smaller motor, yet be incapable of locking or stalling.

Further objects and novel features of my construction will be apparent from the following specifications when considered together with the accompanying drawings, in which:

Fig. 1 is a longitudinal cross sectional view of a tool and an impact clutch embodying my invention.

Fig. 2 is a sectional view of the same tool cut on line 2—2 of Fig. 1.

Fig. 3 is a sectional view of the same tool cut on line 3—3 of Fig. 1 showing the clutch engaged and enlarged for clarity.

Fig. 4 is view in elevation of the clutch parts enlarged for clarity.

Fig. 5 is an end view in elevation of the tool shown in Fig. 1.

Fig. 6 is a side elevation of a tubular spacer.

Figs. 7 and 8 are fragmentary views of the portion of Fig. 3 below the line 7—8 showing alternative forms.

Fig. 9 is a fragmentary view in elevation showing an indexing of the manual control of the air valve shown in Figs. 1 and 2.

Shown in Fig. 1 is a revolvable hammer 11, integral with a rotor shaft 12. Passing at right angles through hammer 11 is a bolt 13 which is necked down just inside end 14 of bolt 13 to position the center of gyration beyond the axis of the hammer 11 and toward the other end 15 of bolt 13. The ends 14 and 15 of the hammer are spherically turned on a radius a trifle smaller than that of the outside radius of the hammer 11. To resist the centrifugal force of the bolt when the hammer 11 is revolved is a prestressed compression spring 18. To limit the expansion of the spring 18 is a ring 16 and a retainer spring clip 17. Surrounding the hammer 11 and bolt 13 is a cup-like anvil housing 20 having cylindrical, circumambient internal walls with a square on one end 19 to fit a standard nut socket wrench, not shown. Other conventional means, not shown, can be attached at this point for driving screw drivers, studs and the like. A compression spring 21 with a button 22 in one end, is inserted in the hollow pilot 23 of the hammer 11, which is journaled in the housing 20. Spring 21 tends to space housing 20 and the hammer 11. To limit the longitudinal movement of housing 20 on hammer 11 incident to spring 21 is a retainer ring 24 fitted into an internal groove in housing 20. In one portion of the peripheral wall of housing 20 is an elongated hole 30 which may have an annular dimension substantially twice the width of the bolt 13. See Figs. 1, 3 and 4. When hammer 11 is axially pressed towards the work, spring 21 is compressed until thrust bearing surfaces 31 of hammer 11 and 32 in housing 20 contact. Then the elongated hole 30 lines up with the bore for the bolt 13. The width of hole 30 is slightly wider than the small end 15 of bolt 13 but smaller than the large end 14. An air vent hole 33 is drilled opposite the bisecting radius of the hole 30, but as shown in Fig. 3 when bolt 13 is in contact with the ends 34 or 35 of the elongated hole 30 the vent hole 33 is closed and any further relative movement of the parts tends to close it more until the hammer 11 turns nearly one turn in the housing 20. Accordingly during impact when 15 is striking either 34 or 35, and bolt 13 is thrown violently out of engagement with 34 or 35 as further explained hereafter, an air compression chamber is formed at 36 to resist the disengagement of the bolt and to cushion the blow of end 14 of bolt 13 against the internal wall of housing 20 and likewise when it is desired that bolt 13 move into an engaging position with 34 or 35 air may enter through vent 33 at the right instant to expedite its movement.

Bolt 13 is cylindrical and is not keyed so that it may turn freely if end 15 should rub the side walls of the elongated hole 30 or turn from vibration or any other cause. This permits the distribution of wear over its peripheral surface. The side walls of end 15 are shown parallel in Fig. 3 but because of the annular relationship they actually have a cam angle which tends to throw end 15 toward the tool axis under impact. For example note that although hole ends 34 and 35 coincide with the bolt end 15 they are not radial surfaces. In Figs. 7 and 8 are shown different angles on end 15 of bolt 13 and the elongated hole ends 34 and 35. In Fig. 7 end 15 is tapered to increase the cam angle tending to throw the bolt out of engagement. I will hereafter call this the "throw out" angle. In Fig. 8 this taper is reversed to decrease the throw out angle or even produce a negative throw out angle. By varying this angle, the strength of spring 18 and the mass of bolt 13, I am able to vary the time necessary to disengage the clutch and vary the speed at which the clutch will disengage and accordingly the deceleration of the hammer and other revolving parts hereafter described to produce impact blows of various intensities suitable to various speeds or R. P. M.'s of the hammer 11.

Since end 15 of bolt 13 is either cylindrical or conical and ends 34 and 35 of the elongated hole 30 coincide therewith, it is a simple matter to elongate hole 30 by grinding its ends 34 or 35 when wear occurs on the lips 37 and 38, Fig. 3, of the ends 34 or 35 to renew the contacting impact surface or change their angle. This is very important in reducing the maintenance of the tool.

In order to provide an anvil of maximum strength and minimum weight and good dynamic balance, I have made the body of the anvil housing 20 eccentric, producing a thicker wall where the strains are the greatest such as at the impact surfaces at the ends 34 and 35 of the elongated hole compared with the opposite side such as where the vent hole 33 is drilled where the strains are much lighter.

The disassembly of the tool is almost instantaneous. The retainer clip 24 is released by the insertion of a sharp pointed tool through a conventional slot 39 (Fig. 2) in the adjacent rim of housing 20. Spring 21 separates the housing from the hammer 11 and the bolt 13 will fall out under gravity if end 14 is lower than end 15. The same sharp pointed tool inserted in either of holes 50, Fig. 3, which are accessible from the exposed end of hammer 11, will release spring clip 17. Then ring 16 and spring 18 will usually eject themselves.

To change spring 18 or bolt 13 for one similar but of greater or less mass to vary the frequency or intensity of the impact blows, the new spring 18 is inserted, then ring 16 followed by retainer clip 17. The clip is pushed into place with the end 14 by temporarily reversing the bolt 13. Then bolt is inserted and housing 20 set in place over hammer 11 and retainer ring 24 snapped into place.

In other words, it is obvious that a conservative estimate of time to disassemble my tool would be 15 seconds and to assemble it, one minute. This being the case, screw adjustments of spring pressure, etc., are unnecessary since it is easier and more efficient, compact and durable to simply have springs of different strength and bolts of different masses.

With a tool of this type, if one had two nuts of substantially the same size but which required different tightness, one could give one more impact blows than the other. So the so-called adjustment on tools of this general type, when there is any provided, is for fairly permanent setups. Some companies object to adjustments which are exposed because workmen without authority can change them, whereas with an adjustment such as mine only those with the parts can tamper with the tool adjustment and worn parts can be replaced so quickly that an assembly line is not delayed beyond the capacity of the operator to catch up.

The impact clutch as described may be attached and driven by any sort of a revolving spindle and as such its operation is as follows:

A suitable socket or other tool, not shown, is attached to the end of housing 20 such as to the square end 19 or any other suitable connection. The hammer 11 is revolved by any suitable motor means, not shown, or by the air motor, shown, but as yet not described. To engage the clutch, spring 21 is compressed by axial or longitudinal pressure until the thrust bearing surfaces 31 and 32 contact, at which time end 15 of bolt 13 lines up with the elongated hole 30. When the speed of the hammer is sufficient to effect centrifugal forces to overcome the prestressed spring 18, the bolt 13 will snap out suddenly into an engaging position in the elongated hole 30. This movement is substantially instantaneous once the centrifugal force over-balances the spring force, because the simultaneous movement of the center of gyration of bolt 13 and the fact that the forces of spring 18 are almost constant because spring 18 is highly prestressed and because at this time air may enter behind end 14 of bolt 13 through the vent 33, so that the bolt 13 is fully engaged in elongated slot 30.

When bolt 13 in its engaged position shown in Fig. 4 strikes the elongated hole end 34 or 35, the turning of 20 being blocked by the resistance of the nut or other work, the hammer 11 and any attendant revolving parts are decelerated, the centrifugal force acting against spring 18 is practically eliminated or substantially reduced and the spring 18 withdraws bolt 13 from its engagement with end 33 or 34 with or without or against the cam action between bolt end 15 and hole ends 33 or 34, and thus bolt 13 is thrown rectilineally back towards the internal wall of the housing 20 with the air cushion in chamber 36 acting to break its force and decelerate the bolt 13 longitudinally.

The mass or inertia of the bolt 13 plays an important part in timing this movement. This is only one reason why the bolt is made practically the full length of the diameter of the hammer 11 and is designed to have a substantial diameter. Another reason for the length of bolt 13 is to provide bearings well apart at its ends to avoid undue friction incident to cocking because of the generous diameter of the bolt.

The hammer 11 is now quite free to accelerate until it again reaches the predetermined speed at which its centrifugal force will overcome spring 18. The end 14 of bolt 13 is too large to get out of the elongated hole 30 or into an engaging position. Spring 18 cannot press the end 14 against the internal wall of the housing because the action of spring 18 is limited by the ring 16 and the retainer clip 17.

Holes 51 are drilled in hammer 11 to substantially balance the hammer and bolt assembly when they are revolving at high speed without housing 20 and the impact blows are taking place which is called rapping.

When the nut (not shown), or other piece being worked on, is sufficiently tight then the longitudinal pressure is released and spring 21 expands and bolt 13 no longer lines up with the elongated hole 30 and the rapping ceases even though the motive power continues to revolve hammer 11.

From this description of the parts, it will be obvious that one feature of my invention is that the impact clutch is reversible and that it may be used for tightening or loosening either right hand or left hand screws.

The function of spring 18 is to prevent the engagement of bolt 13 with anvil 20 until the hammer has been accelerated to a predetermined speed, which may not in some cases be attainable in one revolution with a small motor without gearing. Since no more than one impact can occur per revolution of the hammer with this structure, the spring 18 may be omitted substituting the hard fiber spacer 40 (Fig. 6) when only one lighter blow per revolution is desired in which case a cam as shown in Fig. 7 is employed to disengage the bolt 13 during impact. To further compare the operation of my clutch with and without spring 18 as shown respectively in Figures 1 and 7, it might be noted that with spring 18 the withdrawal of bolt 13 from engagement with anvil 30 is automatic; that is, it takes place under forces stored in spring 18 by the centrifugal forces moving the bolt 13 toward anvil 30, which stored spring forces are later automatically released when the speed of the parts are reduced so that the centrifugal forces set up in the bolt are less than the stored spring forces, plus the friction of the contacting surfaces. Under actual operating conditions where there is no cam angle in the contacting surfaces of bolt 13 and anvil 30 as in Figure 1, the friction of the moving engaging parts is such that spring 18 will not withdraw the bolt until the hammer has been brought to substantially a full stop and the impact forces have ceased. Even then the friction of the surfaces under the locked torque of the motor will often prevent the withdrawal of the bolt 13 until the motive power has been shut off eliminating the torque.

When spring 18 is omitted and a spacer such as 40 Fig. 6 is substituted, then the cam action such as shown in Fig. 7 provides mechanical forces for disengaging the bolt 13 from anvil 30. In contradistinction to the automatic spring means the cam action is not automatic but mechanical, that is the spring 18 withdraws bolt 13 by stored or potential forces, whereas the cam mechanically accelerates bolt 13 by the direct application of wedging forces without a period of delay and immediately disengages the bolt during the period of impact. The springless cam construction does not have inherent forces for its actuation and is not self-actuating as by releasing stored energy from a spring but is actuated by the actual forces of impact the direction of which is altered by the cam.

Pneumatic motors with their almost instantaneous acceleration often produce excellent results without the spring but usually when the driving motor is electric or when the torque and therefore the acceleration of the motor is limited to save weight for the operator's convenience it is difficult to produce as severe an impact blow at every revolution of the motor as with a plurality of blows per revolution, because of the inability of the motor to accelerate itself back to its original speed between blows, that is in one revolution. Therefore, I have provided spring 18 to prevent the engagement bolt 13, before a certain speed has been attained and by selecting a spring of proper resistance with a motor of a given size or power for given acceleration to produce one impact for every two, three, four, etc., revolutions, thus ensuring blows of uniform power, and to ensure not overloading the motor. Also blows at higher speeds are more effective because the momentum of the revolving parts varies as the square of the speed.

In a majority of cases, the impact clutch described will be used in connection with air motors and one characteristic of air power is that the line pressure may constantly fluctuate according to the setting of the instruments which start and stop the compressor and the amount of air being used on the line. Also the manufacturer of a tool such as a nut setter recommends their tools for a specified result without knowing the average air pressure on the line. Also the clutch may not be durable or safe in operation at excessive speeds. Also the customer wants uniform results so that all bolts will be set to a substantially uniform tightness and most certainly so that some will not be loose and others broken. For these reasons, it is imperative that some form of speed and power regulation be associated with an impact clutch. The constant sudden change of speed of the hammer 11 and all parts attached thereto for driving it, is such that conventional centrifugal governors have not been practical for use with impact clutches, especially when the motor is directly connected to the impact clutch.

Accordingly and because of the specific requirements of my clutch, I have shown an air regulator of a novel design and special features associated in operation with my clutch to limit under varying conditions the speed of the tool, to harmonize the speed of the air motor with the speed at which bolt 13 engages the ends 34 and 35 of hole 30 so that when rapping the bolt will fully engage.

An air intake pipe (not shown) is threaded into nut 60 which is threaded into a housing 61. A tube 62 is held snugly in a bore of the housing and also between a shoulder 63 and the nut 60. Two port holes or orifices 64 oppositely pierce this tube and a peripheral air channel groove 65 interconnects these port holes. Having opposed ports balances the air pressure and reduces valve friction.

An intermediate tube 66 closed at one end with a manually controlled indexing flange 67 is mounted for limited rotary motion about its axis and is held against longitudinal movement by its flange 67 and the retaining ring 68. Conventional means (not shown) may be used to hold flange 67 in its selected position. Flange 67 may be suitably indexed and marked to indicate the speeds or the type work best done at specific speeds, or the number of impacts per revolution. See Fig. 9. Opposed port holes 69 pierce the intermediate tube 66.

Mounted for longitudinal movement in the intermediate tube 66 is an internal valve part or sleeve 70 which is axially drilled at one end to a suitable depth to connect with opposed holes 71 pierced through its walls. The other end of valve part 70 is also axially drilled to receive a compression spring 72 designed to resist the longitudinal movement of 70 in tube 66 under the pressure of the air. An air vent 73 ensures atmospheric pressure behind the valve. A dog point set screw 75 is threaded through the housing 61 and fixedly indexes the outer tube 62 and passes through a peripherally elongated hole 76 in the intermediate tube 66 limiting its turning movement and passes through a longitudinally elongated hole 77 in the valve part 70 indexing it but allowing longitudinal movement. These parts are indexed by set screw 75 to line up port 71 with port 69 and oversize port 64 in certain conditions, but so that the passage between ports 71 and 69 is reduced in width when the manually indexing flange 67 is turned and is reduced in length when the spring 72 is compressed by the air pressure. The orifices shown here are square but it is not my intention to limit my invention by the shape of the holes which may be square, triangular, oblong, oval, round, or any other shape or may not be the same in shape or size in all places.

The spring 72 is of such strength and prestressing that in connection with the orifice shape elected that as the air pressure in the line changes, the volume of air passing through the orifices will be automatically varied to maintain a substantially constant free speed or acceleration of the tool.

In operation the width of the effective opening of ports 71 and 69 is regulated by turning flange 67 until a speed is selected most suitable for the best operation of the impact clutch. Air entering through nut 60 passes through the orifices formed by 71 and 69, and also compresses the spring 72, thereby further limits the effective ports 71 and 69 in substantial accordance to the speed effectiveness of the line pressure. The air then passes through the port holes 64 and if need be through the air channel groove 65 to enter the air motor.

The air motor being of conventional design, well known in the art, it will be described only generally. The air passes from channels in motor housing 80 through ports 81 in a tube 82 into a motor chamber 88 formed by a cylindrical rotor 83 eccentrically disposed therein with four blades 84 slidably mounted in longitudinal and radial cuts in the rotor 83. The rotor is keyed to a shaft 12 which is integral with the hammer 11 and is supported by bearings 85 and 86. Partition plates 87 and 87' form the bottom and top of the motor chamber respectively and the exhaust air passes from the chamber 88 through passages in housing 80 (not shown).

It is understood that various changes and modifications in sizes and arrangements of the various elements shown may be made, and additional means may be added to and others omitted in the structure and combinations incident to the particular embodiments of my invention which I have shown and described without departing from the spirit of my invention which is defined by the following claims.

I claim:

1. In an impact clutch, the combination of a revolvable hammer member substantially cylindrical in form, an anvil tubular in form solidly closed at one end revolvable about said hammer, an interconnecting member mounted for rectilinear movement transversely of the hammer member, an obstruction in said anvil member engageable by the interconnecting member and a retainer ring seated in the inside diameter of the anvil member to limit its longitudinal movement in one direction relative to the hammer member.

2. In an impact tool, a rotatable hammer, a rotatable cup shaped anvil member, and an opening in the periphery of said anvil member, means to apply impact blows between the hammer member and the end surfaces of said opening, the mass of said anvil member being disposed to provide heavier walls adjacent to the side surfaces of said hole than on the opposite side of said anvil member, thereby both strengthening to receive the impact blows and dynamically balancing said member.

3. In a rotatable clutch to effect sequential impact blows, a driver hammer, a driven anvil, an engageable surface therein, and an intermediate member mounted for outward movement in and relative to the hammer at an angle from the axis of rotation of the hammer to engage the engageable surface of the anvil member, the hammer and anvil being mounted for relative longitudinal movement on their common axis to effect two positions and modes of operation, the first position being one wherein the intermediate member is sufficiently misaligned with the anvil to prevent the engagement of the intermediate member with the engageable surface of the anvil member and thus afford relative free turning of the hammer relative to the anvil, and the second position being one wherein the intermediate member is aligned with the engageable surface of the anvil to engage therewith to effect impact blows therebetween, one of said positions being normal and the change to the other position being responsive to axial pressure.

4. In an intermittent impact clutch to effect sequential impact blows, a rotary hammer having a transverse aperture therein, a bolt mounted for rectilinear movement longitudinally of said aperture under centrifugal force, an anvil having an annular wall surrounding the revolvable hammer, and obstacle means recessed in said annular wall to engage the bolt as a result of the movement of the bolt under centrifugal force.

5. In an intermittent impact clutch to effect sequential impact blows, a rotary hammer having a transverse aperture therein, a bolt mounted for rectilinear movement longitudinally of said aperture under centrifugal force, an anvil having an annular wall surrounding the revolvable hammer, and obstacle means recessed in said annular wall to engage the bolt as a result of the movement of the bolt under centrifugal force, and a spring in the aperture and engaging the bolt to oppose the centrifugal force and disengage the bolt from the obstacle means.

6. In an impact clutch, the combination of revolving hammer and anvil member, said anvil member having an impact receiving surface, one of said members having substantially rectilinear recess walls, and a third member mounted between said recess walls for bodily rectilinear movement under the influence of centrifugal force and effective to interconnect and disconnect the hammer and the anvil members for intermittently transmitting torque and impact blows therebetween, and sliding cam means provided on said third member to disconnect said member through a resultant of the force of each impact blow, the mass of said third member being such as to materially resist sudden acceleration incident to said disconnection, thereby governing the time interval between initial impact and final complete disengagement of the hammer and the anvil, said cam means and said impact receiving surface having a relatively small angle with respect to the direction of the bodily rectilinear movement of the third member.

7. In an intermittent impact clutch to effect sequential impact blows, the combination of a rotatable hammer member, an anvil member, and an interconnecting cylindrical member having an impact surface at one end and transversely mounted in the hammer for longitudinal movement under centrifugal force for connecting and disconnecting said members, said cylindrical member being mounted for relatively free rotary motion about its longitudinal axis to distribute the wear over the periphery of its impact surface.

8. In an intermittent clutch to produce impact blows, a rotatable hammer, an anvil member, a single member mounted in the hammer for movement under centrifugal forces to interengage the anvil member and the hammer, a sliding tapered cam surface on at least one of said members to effect a resultant from the impact blow effective to throw said single member out of said interengagement to free the hammer for a period of acceleration.

9. In an intermittent impact clutch to effect sequential impact blows, an anvil member having an impact receiving surface, a rotary hammer member mounted to rotate in the anvil, an interconnecting member comprising a body element with a tapered impact delivering portion at one end of the body element, said interconnecting member being mounted for bodily rectilinear movement transversely of the hammer member and being responsive to centrifugal force to effect impact engagement between the tapered impact delivering portion of the interconnecting member and the impact receiving surface of the anvil, said tapered impact delivering portion in combination with said impact receiving surface producing at the instant of impact a cam action to oppose said centrifugal force and effect disengagement of said anvil and said interconnecting member.

10. In an intermittent impact clutch to effect sequential impact blows, an anvil member having a recessed impact receiving surface provided therein, a rotary hammer member mounted to rotate in the anvil, single interconnecting member comprising a body element with a sliding cam impact delivering portion at one end of the body element, said interconnecting member being mounted for bodily rectilinear movement transversely of the hammer member and being responsive to centrifugal force to effect impact engagement between the sliding cam impact delivering portion of the interconnecting member and the impact receiving surface of the anvil, said sliding cam impact delivering portion in combination with said impact receiving surface producing at the instant of impact a cam action to oppose said centrifugal force and effect disengagement of said anvil and said interconnecting member.

11. In an intermittent impact clutch to effect sequential impact blows, an anvil member having an impact receiving surface, a rotary hammer member mounted to rotate in the anvil, an interconnecting member comprising a body element with a sliding cam impact delivering portion at one end of the body element, said interconnecting member being mounted for bodily rectilinear movement transversely of the hammer member and being responsive to centrifugal force to effect impact engagement between the sliding cam impact delivering portion of the interconnecting member and the impact receiving surface of the anvil, said sliding cam impact delivering portion in combination with said impact receiving surface producing at the instant of impact a cam action to oppose said centrifugal force and effect disengagement of said anvil and said interconnecting member, said cam impact delivering portion having a relatively small angle with respect to the direction of the bodily rectilinear movement of the interconnecting member.

12. In an intermittent impact clutch to effect sequential impact blows, an anvil member having an impact receiving surface, a rotary hammer member mounted to rotate in the anvil, an interconnecting member comprising a body element with a sliding cam impact delivering portion at one end of the body element, said interconnecting member being mounted for bodily rectilinear movement transversely of the hammer member and being responsive to centrifugal force to effect impact engagement between the sliding cam impact delivering portion of the interconnecting member and the impact receiving surface of the anvil, said sliding cam impact delivering portion in combination with said impact receiving surface producing at the instant of impact a cam action to oppose said centrifugal force and effect disengagement of said anvil and said interconnecting member.

13. In a reversible intermittent impact clutch to effect sequential impact blows, an anvil member having first and second impact receiving surfaces annularly spaced apart from each other, a rotary hammer member mounted to rotate in the anvil, an interconnecting member comprising a body element with a tapered impact delivering portion at one end of the body element, said interconnecting member being mounted for bodily rectilinear movement transversely of the hammer member and being responsive to centrifugal forces to effect upon rotation of the hammer member in one direction impact engagement between the impact delivering portion of the interconnecting member and the first impact receiving surface of the anvil and to effect upon rotation of the hammer member in the opposite direction impact engagement between the impact delivering portion of the interconnecting member and the second impact receiving surface of the anvil, each of said impact receiving surfaces in combination with said impact delivering portion producing at the instant of impact a cam action to oppose said centrifugal forces and effect disengagement of said anvil and said interconnecting member.

14. In a reversible intermittent impact clutch to effect sequential impact blows, an anvil member having first and second impact receiving surfaces annularly spaced apart from each other, a rotary hammer member mounted to rotate in the anvil, an interconnecting member comprising a body element with a tapered impact delivering portion at only one end of the body element, said body element extending beyond the axis of rotation of the rotary hammer member, said interconnecting member being mounted for bodily rectilinear movement transversely of the hammer member and being responsive to centrifugal forces to effect upon rotation of the hammer member in one direction impact engagement between the impact delivering portion of the interconnecting member and the first impact receiving surface of the anvil and to effect upon rotation of the hammer member in the opposite direction impact engagement between the impact delivering portion of the interconnecting member and the second impact receiving surface of the anvil, each of said impact receiving surfaces in combination with said impact delivering portion producing at the instant of impact a cam action to oppose said centrifugal forces and effect disengagement of said anvil and said interconnecting member.

15. In a reversible intermittent impact clutch to effect sequential impact blows, an anvil member having first and second recessed impact receiving surfaces provided therein and annularly spaced apart from each other, a rotary hammer member mounted to rotate in the anvil, an interconnecting member comprising a body element with a cam impact delivering portion at one end of the body element, said interconnecting member being mounted for bodily rectilinear movement transversely of the hammer member and being responsive to centrifugal forces to effect upon rotation of the hammer member in one direction impact engagement between the impact delivering portion of the interconnecting member and the first impact receiving surface of the anvil and to effect upon rotation of the hammer member in the opposite direction impact engagement between the impact delivering portion of the interconnecting member and the second impact receiving surface of the anvil, each of said impact receiving surfaces in combination with said impact delivering portion producing at the instant of impact a cam action to oppose said centrifugal forces and effect disengagement of said anvil and said interconnecting member.

16. In a reversible intermittent impact clutch to effect sequential impact blows, an anvil member having first and second recessed impact receiving surfaces provided therein and annularly spaced apart from each other, a rotary hammer member mounted to rotate in the anvil, an interconnecting member comprising a body element with a cam impact delivering portion at one end of the body element, said interconnecting member being mounted for bodily rectilinear movement transversely of the hammer member and being responsive to centrifugal forces to effect upon rotation of the hammer member in one direction impact engagement between the impact delivering portion of the interconnecting member and the first impact receiving surface of the anvil and to effect upon rotation of the hammer member in the oppostie direction impact engagement between the impact delivering portion of the interconnecting member and the second impact receiving surface of the anvil, each of said impact receiving surfaces in combination with said impact delivering portion producing at the instant of impact a cam action to oppose said centrifugal forces and effect disengagement of said anvil and said interconnecting member, said cam impact delivering portion having opposite sides, the annular dimension between said first and second impact receiving surfaces being at least substantially twice as great as the distance between opposite sides of the impact delivering portion of the interconnecting member.

17. In a reversible intermittent impact clutch to effect sequential impact blows, an anvil member having an elongated annularly disposed slot with first and second recessed impact receiving surfaces provided on the ends of said slot, a rotary hammer member mounted to rotate in the anvil, an interconnecting member comprising a body element with a cam impact delivering portion at only one end of the body element, said interconnecting member being mounted for bodily rectilinear movement transversely of the hammer member and being responsive to centrifugal forces to effect upon rotation of the hammer member in one direction impact engagement between the impact delivering portion of the interconnecting member and the first impact receiving surface of the anvil and to effect upon rotation of the hammer member in the opposite direction impact engagement between the impact delivering portion of the interconnecting member and the second impact receiving surface of the anvil, each of said impact receiving surfaces in combination with said impact delivering portion producing at the instant of impact a cam action to oppose said centrifugal forces and effect disengagement of said anvil and said interconnecting member.

18. In a reversible intermittent impact clutch to effect sequential impact blows, an anvil member having first and second abutment impact receiving surfaces provided thereon and annularly spaced apart from each other, a rotary hammer member mounted to rotate in the anvil and having a transversely disposed aperture, at least an interconnecting member having a cam impact delivering surface, said interconnecting member being disposed in said aperture and being bodily movable therein transversely of the hammer member and being responsive to centrifugal forces to effect upon rotation of the hammer member in one direction impact engagement between the impact delivering surface of the interconnecting member and the first impact receiving surface of the anvil and to effect upon rotation of the hammer member in the opposite direction impact engagement between the impact delivering surface of the interconnecting member and the second impact receiving surface of the anvil, each of said impact receiving surfaces in combination with said impact delivering surface producing at the instant of impact a cam action to oppose said centrifugal forces and effect disengagement of said anvil and said interconnecting member.

19. In a reversible intermittent impact clutch to effect sequential impact blows, an anvil member having first and second abutment impact receiving surfaces provided thereon and annularly spaced apart from each other, a rotary hammer member mounted to rotate in the anvil and having a transversely disposed aperture, at least an interconnecting member having a cam impact delivering surface, said interconnecting member being disposed in said aperture and being bodily movable therein transversely of the hammer member and being responsive to centrifugal forces to effect upon rotation of the hammer member in one direction impact engagement between the impact delivering surface of the interconnecting member and the first impact receiving surface of the anvil and to effect upon rotation of the hammer member in the opposite direction impact engagement between the impact delivering surface of the interconnecting member and the second impact receiving surface of the anvil, each of said impact receiving surfaces in combination with said impact delivering surface producing at the instant of impact a cam action to oppose said centrifugal forces and effect disengagement of said anvil and said interconnecting member, and a spring in the aperture and engaging the interconnecting member to oppose centrifugal force and accentuate said disengagement action at the instant of impact.

20. In an intermittent rotary impact clutch the combination of a revolvable hammer member having walls defining a bore open at one end, an anvil member having an abutment in alignment with the open end of said bore, an intermediate member inserted loosely in said bore to allow its turning substantially on the axis of said bore and for movement under centrifugal forces therein to engage said abutment when the hammer member revolves.

WILLIAM M. EMERY.